United States Patent
Roberts et al.

(10) Patent No.: US 9,969,287 B2
(45) Date of Patent: May 15, 2018

(54) VEHICLE CHARGING SYSTEM

(71) Applicant: FORD GLOBAL TECHNOLOGIES, LLC, Dearborn, MI (US)

(72) Inventors: Daniel Paul Roberts, Livonia, MI (US); William Najib Mansur, West Bloomfield, MI (US); Beth Ann Dalrymple, Livonia, MI (US); Mark Douglas Malone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 14/792,756

(22) Filed: Jul. 7, 2015

(65) Prior Publication Data

US 2017/0008409 A1    Jan. 12, 2017

(51) Int. Cl.
*H02J 7/00* (2006.01)
*B60L 11/18* (2006.01)

(52) U.S. Cl.
CPC ......... *B60L 11/1829* (2013.01); *B60L 11/182* (2013.01); *B60L 11/1848* (2013.01); *Y02T 10/7005* (2013.01); *Y02T 10/7088* (2013.01); *Y02T 90/124* (2013.01); *Y02T 90/125* (2013.01); *Y02T 90/14* (2013.01)

(58) Field of Classification Search
CPC .......................... B60L 11/182; B60L 11/1824; B60L 11/1829; H02J 7/025
USPC ......................................... 320/104, 108, 109
See application file for complete search history.

(56) References Cited

U.S. PATENT DOCUMENTS

| | | | |
|---|---|---|---|
| 3,105,929 A | 10/1963 | Blue | |
| 5,821,731 A * | 10/1998 | Kuki | ............... B60L 11/1805 320/108 |
| 7,999,506 B1 | 8/2011 | Hollar et al. | |
| 8,473,131 B2 | 6/2013 | Leary | |
| 8,829,851 B2 | 9/2014 | Prosser et al. | |
| 9,266,440 B2 | 2/2016 | Gao et al. | |
| 9,770,993 B2 | 9/2017 | Zhao et al. | |
| 2012/0262002 A1 | 10/2012 | Widmer et al. | |
| 2012/0028673 A1 | 11/2012 | Bonny | |
| 2013/0076296 A1* | 3/2013 | Ushiroda | ............... B60L 3/12 320/101 |
| 2014/0002015 A1 | 1/2014 | Tripathi et al. | |
| 2014/0217966 A1 | 8/2014 | Schneider et al. | |

FOREIGN PATENT DOCUMENTS

EP        2656167 A2    12/2011
WO    2010118075 A2    10/2010

* cited by examiner

*Primary Examiner* — Edward Tso
*Assistant Examiner* — Aaron Piggush
(74) *Attorney, Agent, or Firm* — David B. Kelley; Brooks Kushman P.C.

(57) ABSTRACT

A vehicle charging system may include a parking area, indicia, and a wireless charging station. The indicia may be disposed on the parking area and define a plurality of vehicle parking spots. The wireless charging station may include a primary charge coil and a mechanical conveyor having the primary charge coil mounted thereon. The mechanical conveyor may be configured to move the primary charge coil across and between the parking spots defined by the indicia.

14 Claims, 4 Drawing Sheets

VEHICLE CHARGING SYSTEM

TECHNICAL FIELD

The present disclosure relates to a vehicle charging system for the charging of vehicle batteries.

BACKGROUND

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), fuel cell vehicles, and battery electric vehicles (BEVs). A powertrain of an electric vehicle is typically equipped with a battery that stores electrical power for powering the electric machine. The battery may be recharged by regenerative braking, an internal combustion engine, an electric grid ("plugging in"), or other means of energy harvesting, such as photovoltaics.

Charging stations typically are connected to an electric grid infrastructure to charge a battery of an electric vehicle prior to use. A barrier to adopting electric vehicles is the lack of supporting infrastructure for charging and refueling. Creating new charging stations can be costly and difficult to achieve.

SUMMARY

A vehicle charging system may include a parking area and a wireless charging station. The parking area may have indicia defining multiple parking spots. The wireless charging station may be mounted beneath the parking area. The wireless charging station may include a primary charge coil and a mechanical conveyor having the primary charge coil mounted thereon. The mechanical conveyor may be configured to move the primary charge coil across and between the multiple parking spots.

A vehicle charging system may include a parking area, a mechanical conveyor, and a wireless charging station. The parking area may have parking spot indicia defining multiple parking spots. The mechanical conveyor may extend across the multiple parking spots. The wireless charging station may be at least partially disposed on the mechanical conveyor and may include a proximity sensor, a movable charging head, and a control module. The proximity sensor may be disposed proximate the parking area and may be configured to provide a signal indicative of a vehicle having a receiving coil entering a parking spot of the multiple parking spots. The control module may be programmed to, in response to the signal and to the vehicle coming to a stop, operate the movable charging head to position the movable charging head relative to the receiving coil.

DETAILED DESCRIPTION

Figure 1:
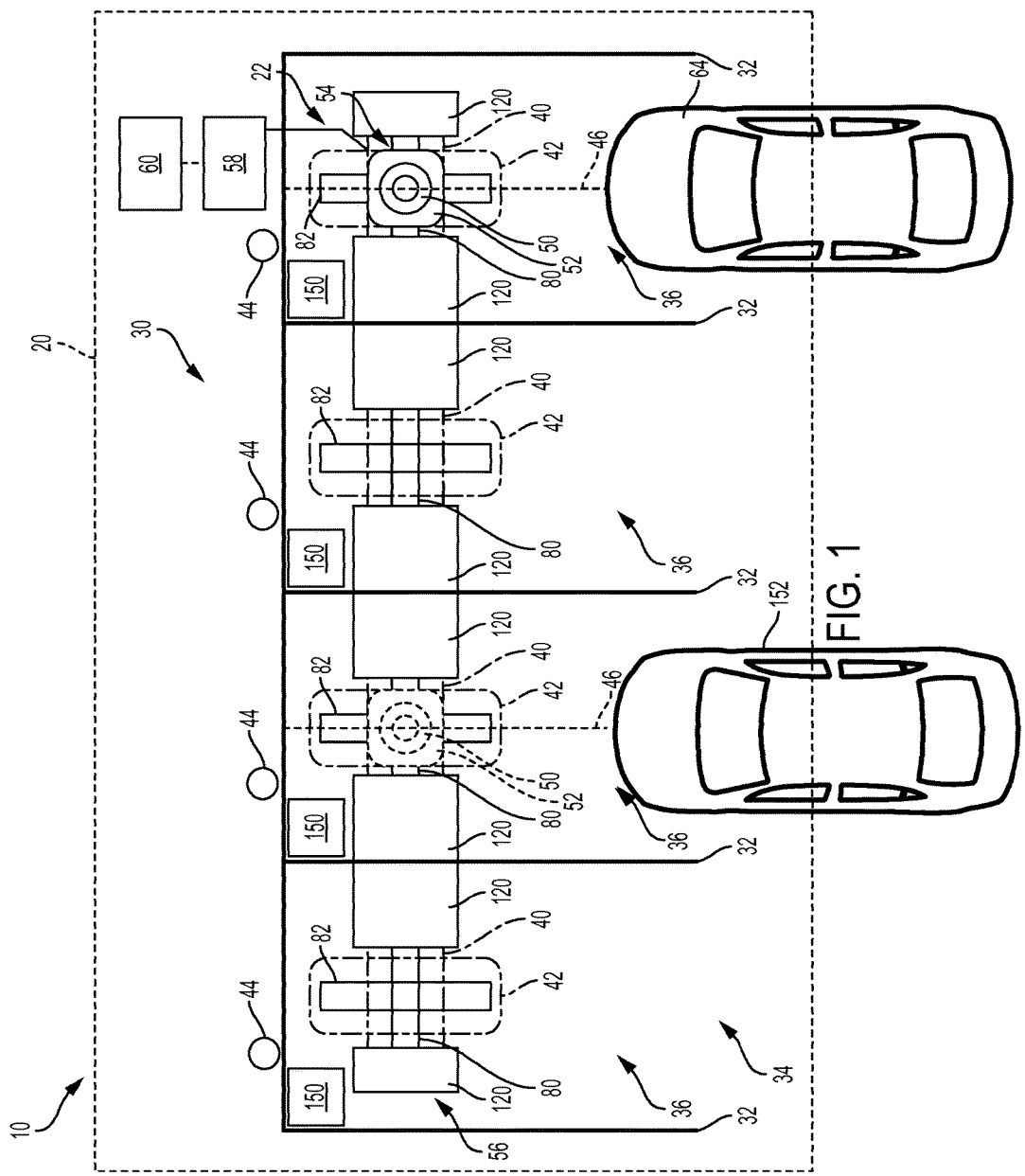
FIG. 1 is a plan view of a parking area having a multiple vehicle wireless charging station having wheel plates.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Some vehicles such as plug-in hybrid electric vehicles (PHEV) and battery electric vehicles (BEV) may include a vehicle traction battery configured to supply electric power to a traction motor. The traction battery, traction motor, and other components cooperate as an electric drive system. In a BEV the electric drive system may be the only source of propulsive power to vehicle fraction wheels, while a PHEV may additionally be provided with an internal combustion engine. Such vehicles may be connected to an external power supply to recharge the traction battery when the vehicle is parked.

Electric vehicle charging stations may be provided at various locations to provide multiple charging points for electric vehicles such as the HEV's, BEV's, or the like. The various locations may include gas stations, parking spaces, parking lots, or even a person's home. The electric vehicle charging stations may include multiple charging points connected to an electrical circuit. Unfortunately, the number of available charging points may be limited and the amount of power delivered may also be limited. For example, in situations when at least two charging ports are operated simultaneously the total amount of power supplied may be limited. A customer may be required to exit the vehicle to connect the vehicle to the charging port to charge the traction battery using charge cables. The charge cables may be dirty or wet or inconveniently stowed within the vehicle or proximate the vehicle.

Some charging stations may be provided with a wireless charging point to wirelessly charge a vehicle configured to receive a wireless charge. The wireless charging point and a wireless charge receiving coil on the vehicle may be difficult to align due to various factors. For example, the wireless charge receiving coil location may vary by vehicle make and model. Additionally, a customer's parking habits may also influence alignment between the wireless charging point and the wireless charge receiving coil.

A vehicle charging system having a wireless charging station may be provided to wirelessly charge the vehicles, account for misalignment, and may be provided with logic to facilitate the efficient wireless charging between multiple vehicles. The vehicle charging system may account for variation in vehicle size, vehicle type, and vehicle parking space position. The vehicle charging system may also be able to detect the presence of a vehicle within a parking space and the arresting of vehicle movement within the parking space.

Figure 2:
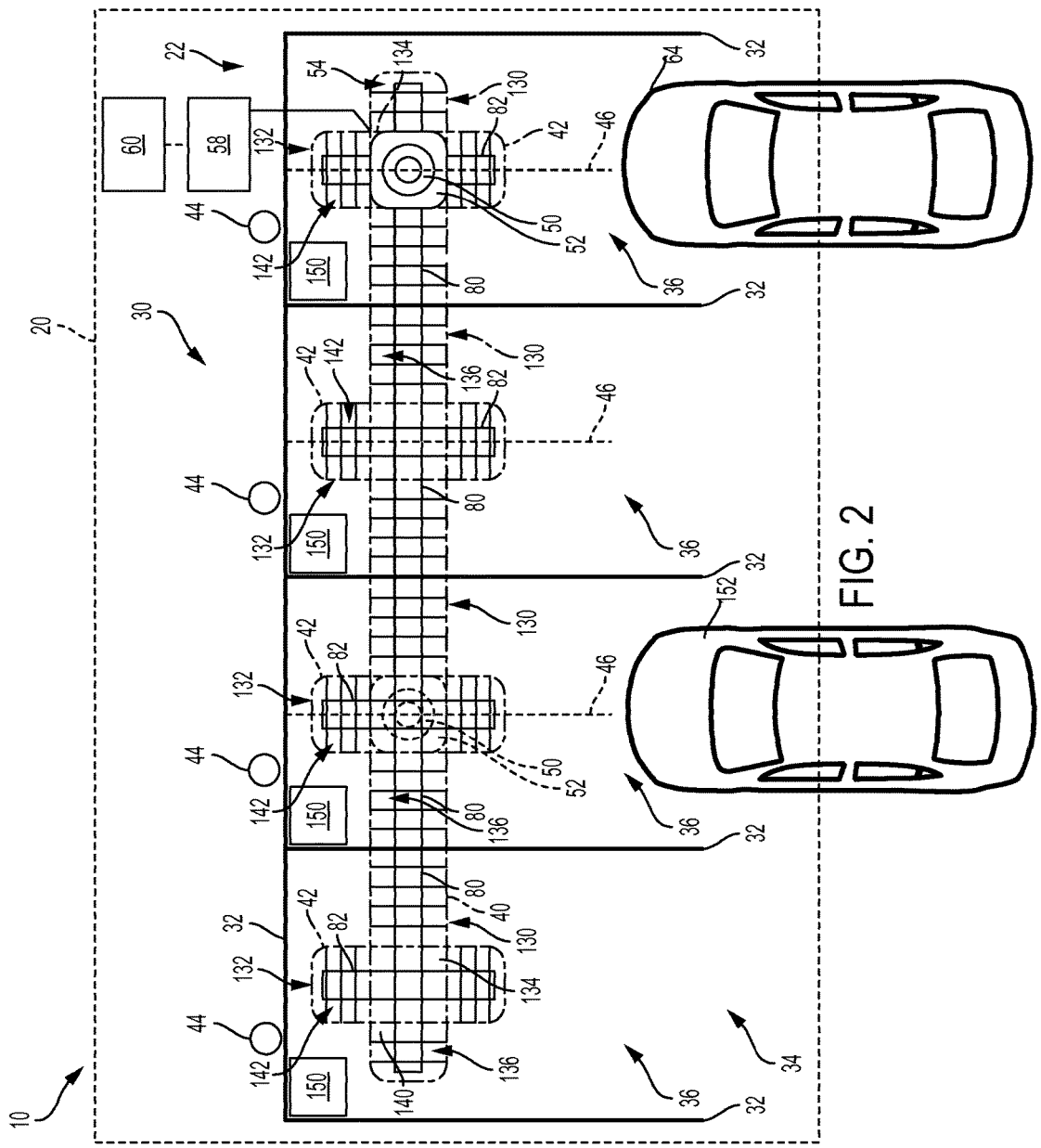
FIG. 2 is a plan view of a parking area having a multiple vehicle wireless charging station having traveling conveyor plates.

Referring to FIGS. 1 and 2, a vehicle charging system 10 is shown. The vehicle charging system 10 may be located in a parking lot, a parking structure, or the like. The vehicle charging system 10 may be configured to share a common wireless charging point between multiple vehicles and maximize the power transfer efficiency. The vehicle charging system 10 may include a parking area 20 and a wireless charging station 22.

The parking area 20 may define an area intended for the parking of multiple vehicles. The parking area 20 may include a surface 30 that may be a durable or semi-durable surface such as concrete, asphalt, wood, or other materials that may provide a surface for vehicle parking In at least one embodiment, the parking area 20 may be a concrete slab having indicia 32 disposed on or within the surface 30. The indicia 32 may define a plurality of or multiple automotive vehicle parking spots 34 and may be referred to as parking spot indicia. The indicia 32 may be markers or dividers defining the limits of a parking spot 36 of the multiple automotive vehicle parking spots 34. The markers may be painted lines defining the lateral extents or a width of the parking spot 36. The markers may also include an abutment, such as a concrete abutment, defining the longitudinal extent or a length of the parking spot 36.

The parking area 20 may include a first channel 40 and a second channel 42. The first channel 40 may be a lateral channel extending laterally across the multiple automotive vehicle parking spots 34. In at least one embodiment, the first channel 40 may be a generally arcuate channel arcing or curving across the multiple automotive vehicle parking spots 34. The first channel 40 may extend below the surface 30 such that the first channel 40 is disposed beneath the parking area 20. The first channel 40 may be disposed substantially perpendicular with respect to the indicia 32. In at least one embodiment, the first channel 40 may be disposed substantially parallel to and spaced apart from the abutment defining the longitudinal extent of the parking spot 36.

The second channel 42 may be a longitudinal channel extending longitudinally within each parking spot 36. The second channel 42 may be disposed between corresponding parking spot indicia 32. The second channel 42 may extend below the surface 30 such that the second channel 42 is disposed beneath the parking area 20. The second channel 42 may intersect the first channel 40. The second channel 42 may be disposed substantially perpendicular to the first channel 40. The second channel 42 may be disposed substantially parallel to and spaced apart from the indicia 32. In at least one embodiment, the second channel 42 may be disposed substantially perpendicular to and spaced apart from the abutment defining the longitudinal extent of the parking spot 36.

A visual indicator 44 may be disposed on the parking area 20. The visual indicator 44 may extend from the surface 30 and may be offset from a centerline 46 of the parking spot 36. The visual indicator 44 may be spaced apart from the first channel 40 and the second channel 42. The visual indicator 44 may be placed directly in front of a driver's seat to minimize parallax error that may arise if the visual indicator 44 is placed directly in front of the centerline 46. The visual indicator 44 may provide a visual target to the driver of the vehicle to aid the driver in aligning the vehicle with the wireless charging station 22. In at least one embodiment, a wheel stop or a recess 48 may be defined by the parking area 20. The recess 48 may be disposed between the first channel 40 and the indicia 32. The recess 48 may extend below the surface 30. The recess 48 may be configured to receive a vehicle wheel to set a vehicle longitudinal position within a parking spot 36 of the multiple automotive vehicle parking spots 34.

The wireless charging station 22 may at least partially be disposed beneath the surface 30 of the parking area 20. The wireless charging station 22 may include a primary charge coil 50, a movable head 52, a mechanical conveyor system 54, a plate assembly 56, and a control module 58.

The primary charge coil 50 may be a source coil configured to transfer power from a power source 60 to a vehicle mounted coil, a receiving coil, or a secondary coil 62. A high voltage wire or cable may extend from the primary charge coil 50 to the power source 60. The secondary coil 62 may be disposed on the underbody or underside of a vehicle 64 that may enter a parking spot 36 of the multiple automotive vehicle parking spots 34. The secondary coil 62 may be in communication with a vehicle mounted controller 66 and/or power electronics operatively connected to a vehicle mounted battery 68. The transfer power from the power source 60 to the secondary coil 62 may charge (increase the state of charge) of the vehicle mounted battery 68.

The primary charge coil 50 may be mounted on the movable head 52. The combination of the primary charge coil 50 and the movable head at 52 may define a movable charging head. The movable head 52 may include a coil supporting structure 72, a lift mechanism 74, and a mounting plate 76. The coil supporting structure 72 may be configured to support the weight of the primary charge coil 50. The lift mechanism 74 may be disposed on the mounting plate 76 and may extend between the coil supporting structure 72 and the mounting plate 76. The lift mechanism 74 may be configured to translate the movable charging head towards or away from the secondary coil 62. The lift mechanism 74 may be configured as a screw drive system, a scissor lift, a belt lift mechanism, a hydraulic lift, or the like. The translation imparted by the lift mechanism 74 may be configured to adjust an air gap to achieve an optimal air gap between the primary charge coil 50 and the secondary coil 62. The adjustment of the air gap may improve the efficiency of wireless power transfer between the primary charge coil 50 and the secondary coil 62. The air gap may be based on a predetermined charge rate arbitrated between the control module 58 and the vehicle mounted controller 66, and the vehicle charging system capacity based on voltage and current. The air gap may be further based on a height of the secondary coil 62 above the surface 30 of the parking area 20.

The movable charging head may be configured to pivot and/or translate the primary charge coil 50 with respect to the first channel 40, the second channel 42, and/or the secondary coil 62. The translation of the primary charge coil 50 along the first channel 40 may laterally position the primary charge coil 50 relative to the secondary coil 62. The translation of the primary charge coil 50 along the second channel 42 may longitudinally position the primary charge coil 50 relative to the secondary coil 62. The translation of the primary charge coil 50 along the second channel 42 may adjust for misalignment of the primary charge coil 50 with the secondary coil 62 along a vehicle longitudinal axis or the centerline 46 of the parking spot 36. The closer the alignment between the primary charge coil 50 and the secondary coil 62, the better the efficiency of wireless power transfer.

The movable charging head may be mounted on the mechanical conveyor system 54. In at least one embodiment, the wireless charging station 22 may be at least partially disposed on the mechanical conveyor system 54. The mechanical conveyor system 54 may be configured to move or translate the combination of the primary charge coil 50 and the movable head 52 within the first channel 40 across and between the multiple automotive vehicle parking spots 34. The mechanical conveyor system 54 may be configured to move or translate the combination of the primary charge coil 50 and the movable head 52 within the second channel 42 across a length of a parking spot 36 of the multiple automotive vehicle parking spots 34.

Figure 3:
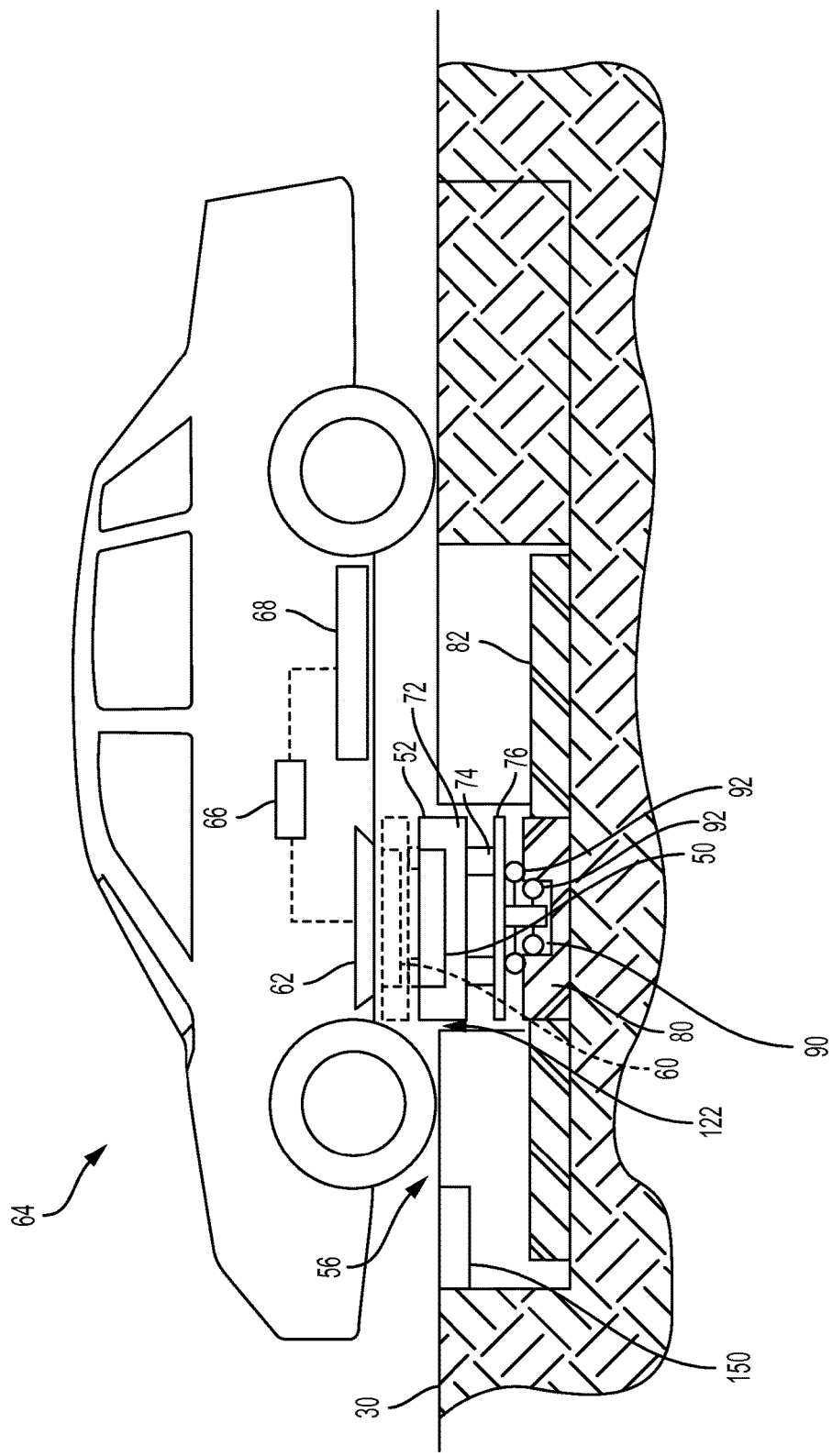
FIG. 3 is a side view of a multiple vehicle wireless charging station having a track/rail and roller system and a vehicle having a secondary (receiving) coil.

Referring to FIG. 3, the mechanical conveyor system 54 may be configured as a track/rail and roller system. The mechanical conveyor system 54 may include a first portion 80 and a second portion 82. The first portion 80 may be a lateral portion disposed within or received within the first channel 40 (lateral channel) extending across the multiple automotive vehicle parking spots 34. The first portion 80 may be configured as a track and/or rail. The first portion 80 may define a first groove 90 extending along a length of the first portion 80. The first groove 90 may be configured to receive a set of wheels or a set of rollers 92 extending from a portion of the mounting plate 76. The set of rollers 92 may aid in supporting and translating the movable charging head along the first portion 80. The first portion 80 (lateral portion) may be configured to translate the movable charging head across and between the multiple automotive vehicle parking spots 34.

The second portion 82 may be a longitudinal portion disposed within or received within the second channel 42 (longitudinal channel) extending along a portion of a length of a parking spot 36 of the multiple automotive vehicle parking spots 34. The second portion 82 may intersect the first portion 80. The second portion 82 may be configured as a track and/or rail. The second portion 82 may define a second groove 94 extending along a length of the second portion 82. The second groove 94 may be configured to receive the set of rollers 92 extending from the portion of the mounting plate 76. The second groove 94 may receive the set of rollers 92 as the movable charging head translates along the second portion 82. The set of rollers 92 may aid in supporting and translating the movable charging head along the second portion 82. The second portion 82 (longitudinal portion) may be configured to translate the movable charging head longitudinally within a corresponding parking spot 36 of the multiple automotive vehicle parking spots 34.

The first portion 80 (lateral portion) may be disposed on and carried by the second portion 82 (longitudinal portion). In at least one embodiment, the second portion 82 (longitudinal portion) may be disposed on and carried by the first portion 80 (lateral portion). The configuration of the first portion 80 and the second portion 82 may enable the movable charging head to translate laterally on the first portion 80 within the first channel 40 and to translate longitudinally on the second portion 82 within the second channel 42 to proximately align the primary charge coil 50 with the secondary coil 62.

Figure 4:
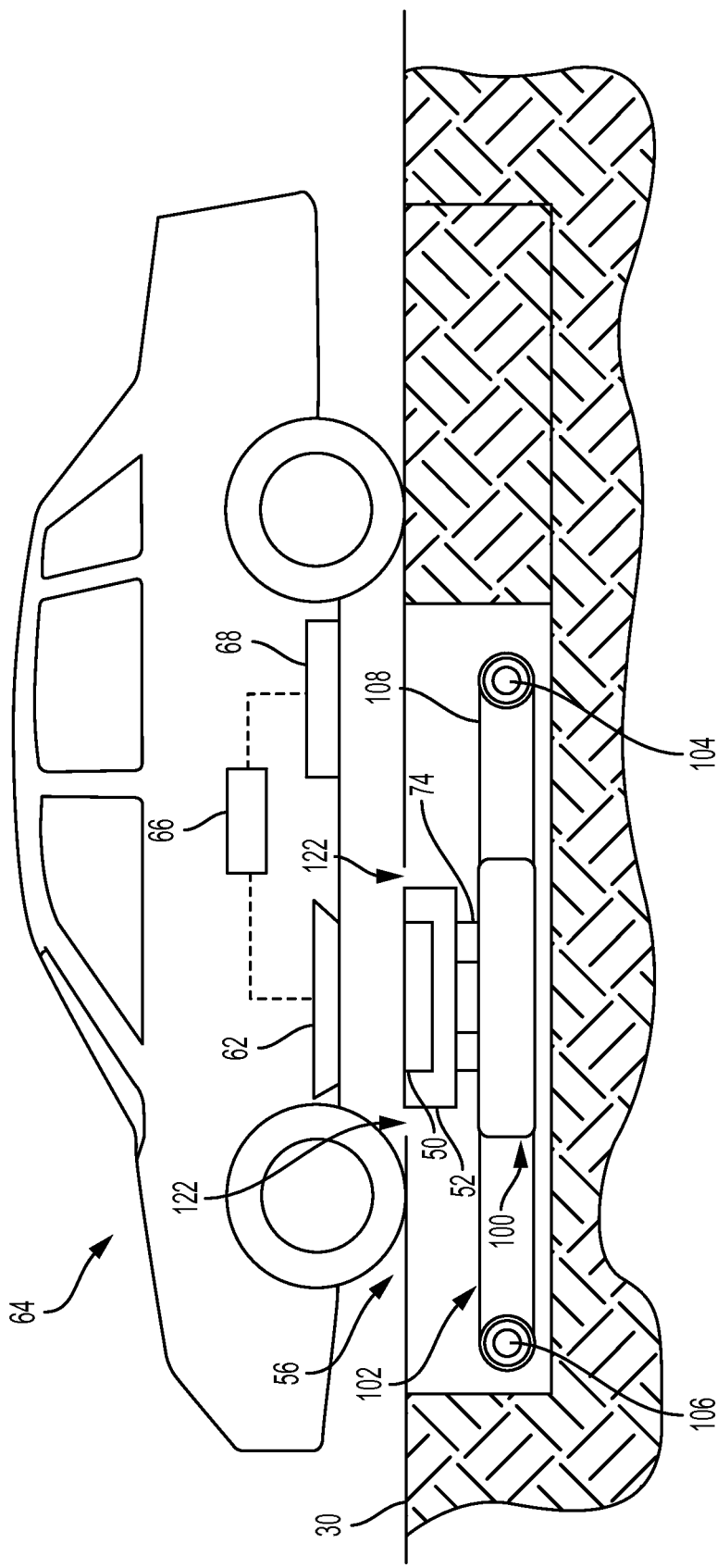
FIG. 4 is a side view of a multiple vehicle wireless charging station having a belt drive system and a vehicle having a secondary (receiving) coil.

Referring to FIG. 4, the mechanical conveyor system 54 may be configured as a chain drive, screw drive, or belt drive assembly. The belt drive assembly may have a first belt drive portion 100 and a second belt drive portion 102. The first belt drive portion 100 may be disposed within or received within the first channel 40. The first belt drive portion 100 may extend across the first channel 40. The first belt drive portion 100 may include a drive pulley, a tag pulley, and a belt extending about the drive pulley and the tag pulley. The first belt drive portion 100 may be configured to translate the movable charging head across and between the multiple automotive vehicle parking spots 34 within the first channel 40.

The second belt drive portion 102 may be disposed within or received within the second channel 42. The second belt drive portion 102 may extend across the second channel 42. The second belt drive portion 102 may include a drive pulley 104, a tag pulley 106, and a belt 108 extending about the drive pulley 104 and the tag pulley 106. The second belt drive portion 102 may be configured to translate the movable charging head longitudinally within a parking spot 36 of the multiple automotive vehicle parking spots 34 within the second channel 42.

The first belt drive portion 100 may be disposed on and carried by the second belt drive portion 102. In at least one embodiment, the second belt drive portion 102 may be disposed on and carried by the first belt drive portion 100. The configuration of the first belt drive portion 100 and the second belt drive portion 102 may enable the movable charging head to translate laterally within the first channel 40 and to translate longitudinally within the second channel 42 to proximately align the primary charge coil 50 with the secondary coil 62.

The plate assembly 56 may be disposed proximate at least one of the first channel 40 and the second channel 42. The plate assembly 56 may be disposed below the surface 30 of the parking area 20. The plate assembly 56 may be configured as a weather or foreign object protector/cover for at least one of the first channel 40 and the second channel 42. The plate assembly 56 may inhibit a wheel of a vehicle entering a parking spot 36 of the plurality of automotive parking spots 34 from protruding or entering the first channel 40 or the second channel 42.

Referring back to FIG. 1, in at least one embodiment, the plate assembly 56 may include a wheel plate 120. The wheel plate 120 may be disposed proximate and extend across the first channel 40. The wheel plate 120 may define a wheel plate opening 122. The wheel plate opening 122 may be disposed proximate an intersection between the first channel 40 and the second channel 42. The wheel plate opening 122 may be oriented such that the movable charging head may translate along the second channel 42 to longitudinally position the primary charge coil 50 with the secondary coil 62. The wheel plate opening 122 may be sized such that the movable charging head may extend at least partially through the wheel plate opening 122 when the primary charge coil 50 is positioned relative to the secondary coil 62.

The plate assembly 56 may include a first plate assembly 130 and a second plate assembly 132. The first plate assembly 130 may be disposed proximate the first channel 40. The first plate assembly 130 may be movably disposed on a guide mechanism disposed on or within the parking area 20. The guide mechanism may be configured to enable the first plate assembly 130 to translate with respect to the first channel 40 in response to translation of the movable charging head by the first portion 80 or the first belt drive portion 100. The first plate assembly 130 may define a first plate opening 134 within which the primary charge coil 50 may extend when positioned relative to the secondary coil 62. The first plate assembly 130 may be configured as a plurality of traveling conveyor plates 136 interconnected by linkages. The guide mechanism may include a plurality of rollers in engagement with the traveling conveyor plates 136 configured to enable the traveling conveyor plates 136 to translate with respect to the first channel 40 in response to translation of the movable charging head by the first portion 80 or the first belt drive portion 100.

The second plate assembly 132 may be disposed proximate the second channel 42. The second plate assembly 132 may be movably disposed on a guide mechanism disposed on or within the parking area 20. The guide mechanism may be configured to enable the second plate assembly 132 to translate with respect to the second channel 42 in response to translation of the movable charging head by the second portion 82 or the second belt drive portion 102. The second plate assembly 132 may define a second plate opening 140 within which the primary charge coil 50 may extend when positioned relative to the secondary coil 62. The second plate assembly 132 may be configured as a plurality of traveling conveyor plates 142 interconnected by linkages. The guide mechanism may include a plurality of rollers in engagement with the traveling conveyor plates 142 configured to enable the traveling conveyor plates 142 to translate with respect to the second channel 42 in response to translation of the movable charging head by the second portion 82 or the second belt drive portion 102.

The wireless charging station 22 may be in communication with or under the control of the control module 58. The control module 58 may control the movable charging head to translate the primary charge coil 50 across and between the multiple automotive vehicle parking spots 34 and within a parking spot 36. The control module 58 may include multiple controllers that operate in conjunction to control various components of the vehicle charging system 10. The control module 58 may be software embedded a controller or may be a separate hardware device. The control module 58 may include at least one microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the control module in controlling the wireless charging station 22.

The control module 58 may communicate with the plurality of sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The control module 58 may further communicate with other controllers over a hardline connection using a common bus protocol (e.g., CAN), and may also employ wireless communication.

The control module 58 may be in communication with the primary charge coil 50, the power source 60, the secondary coil 62, the vehicle mounted controller 66, and the battery 68. The control module 58 may receive signals indicative of a vehicle having a secondary coil entering a parking spot 36 of the multiple automotive vehicle parking spots 34. The control module 58 may receive signals indicative of the battery state of charge level of a vehicle having a secondary coil entering a parking spot 36 of the plurality of automotive parking spots 34.

As stated previously, the control module 58 may receive a signal indicative of the vehicle 64 entering a parking spot 36 of the multiple automotive vehicle parking spots 34. The signal indicative of the vehicle 64 entering a parking spot 36 of the multiple automotive vehicle parking spots 34 may be provided by a proximity sensor 150. The proximity sensor 150 may also be configured to provide a signal indicative of the vehicle 64 coming to a stop within a parking spot 36 of the multiple automotive vehicle parking spots 34. The proximity sensor 150 may be disposed proximate the parking area 20. In at least one embodiment, the proximity sensor 150 may be disposed beneath the surface 30 of the parking area 20.

The proximity sensor 150 may be an inductive loop embedded within the parking area 20. The proximity sensor 150 may be at least one of an ultrasonic sensor, a radar, a light detection and ranging (LIDAR) device, radio detection and ranging (RADAR) device, laser scanner, or a combination thereof. The number, type, and positioning of the proximity sensor 150 may vary based on the implementation of the vehicle charging system 10.

The control module 58 may be configured to operate the movable charging head across and between the multiple automotive vehicle parking spots 34 and within a parking spot 36 of the multiple automotive vehicle parking spots 34. The control module 58 may be programmed, in response to the proximity sensor 150 providing a signal indicative of the vehicle 64 entering the parking spot 36 and to a signal indicative of the vehicle 64 coming to a stop within the parking spot 36, to translate the movable charging head along at least one of the first channel 40 and the second channel 42. The movable charging head may be operated to position the primary charge coil 50 relative to the secondary coil to charge the vehicle 64. The movable charging head may be translated along the first channel 40 to laterally position the primary charge coil 50 relative to the secondary coil 62. The movable charging head may also be translated along the second channel 42 to longitudinally position the primary charge coil 50 relative to the secondary coil 62. For example, the control module 58 may translate the primary charge coil 50 of the movable charging head along the second channel 42 in response to a misalignment between the primary charge coil 50 and the secondary coil 62 along a vehicle longitudinal axis or a centerline 46 of a parking spot 36 of the multiple automotive vehicle parking spots 34. In at least one embodiment, the movable charging head may translate vertically to adjust an air gap between the primary charge coil 50 and the secondary coil 62.

The control module 58 may be provided with control logic configured to determine a charging order of vehicles parked on the parking area 20. The charging order may be a queue indicative of which vehicle will be charged by the wireless charging station 22 first to the last vehicle that will be charged by the wireless charging station. The control module 58 may prioritize the charging of the vehicles based on a time of arrival at the vehicle charging system 10. The control module 58 may complete the charging of the first vehicle to arrive prior to translating the movable charging head to charge the second vehicle to arrive at the vehicle charging system 10. The control module 58 may be configured to, in response to a signal indicative of another vehicle 152 having a secondary coil entering another parking spot of the multiple automotive vehicle parking spots 34 and coming to a stop within the another parking spot, queue the another vehicle 152 to be charged by the primary charge coil 50 after the completion of charging of the vehicle 64.

The control module 58 may shutdown the primary charge coil 50 in response to a completion of charging of the vehicle 64. The control module 58 may detect completion of charging via direct communication between the control module 58 and the vehicle mounted controller 66. The control module 58 may communicate with the vehicle mounted controller 66 over CAN, wireless protocol, or other communication methods. The control module 58 may detect completion of charging by monitoring the primary charge coil current. As the primary charge coil current falls below a threshold current value for a predetermined period of time, the vehicle 64 may be deemed charged. The control module 58 may also set a maximum charging time period for each vehicle and upon the expiration of the time period, the control module 58 may cease charging. The control module 58 may also be provided as part of a based vehicle charging system and may cease charging when the credit balance is depleted. The shutdown of the primary charge coil 50 may cease providing power from the primary charge coil 50 to the secondary coil 62. The control module 58 may then translate the movable charging head from the parking spot 36 to another parking spot of the multiple automotive vehicle parking spots 34. The primary charge coil 50 may be positioned relative to the secondary coil of another vehicle 152.

An example of the control logic of the control module 58 to determine a charging order may occur as follows. The vehicle 64 may arrive and park within a first parking spot of the multiple automotive vehicle parking spots 34. The control module 58 may detect the presence of the vehicle 64 via the proximity sensor 150 within the first parking spot. The movable charging head may translate from an initial position to within the first parking spot of the multiple automotive vehicle parking spots 34. In response to proper positioning of the primary charge coil 50 with respect to the secondary coil 62 of the vehicle 64 the control module 58 permit charging to begin. As the vehicle 64 is being charged, the control module 58 may detect another vehicle 152 entering a second parking spot of the multiple automotive vehicle parking spots 34. The control module 58 may set the second parking spot as priority after the charging of the vehicle 64 within the first parking spot is complete. In response to the completion of the charging of the vehicle 64 within the first parking spot, the control module 58 may translate the movable charging head along the first channel 40 to be within the second parking spot of the multiple automotive vehicle parking spots 34 (as shown in shadow in FIG. 1). In response to proper positioning of the primary charge coil 50 with the secondary coil 62 of another vehicle 152, the control module 58 may permit charging of another vehicle 152 to begin. If no other vehicles have arrived prior to or upon completion of another vehicle 152 within the second parking spot, the control module 58 may cease charging and enter a maintenance mode. The control module 58 while operating in the maintenance mode may periodically operate the movable charging head to top off the battery of any vehicles parked within a parking spot 36 of the multiple automotive vehicle parking spots 34. The maintenance mode may attempt to maintain a full battery state of charge of any vehicles parked within a parking spot 36 of the multiple automotive vehicle parking spots 34.

Should the wireless charging station 22 not be equipped with a proximity sensor 150, the control module 58 may periodically move among the multiple automotive vehicle parking spots 34 to search for a vehicle having a secondary coil 62. If no vehicle was found, the control module 58 may translate the movable charging head to an adjacent parking spot and wait until a vehicle having a secondary coil 62 is found.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle charging system comprising:
    a parking surface having indicia defining multiple parking spots, a first channel extending across the parking spots, and a second channel within each of the multiple parking spots between the indicia and oriented substantially perpendicular to the first channel; and
    a wireless charging station mounted beneath the parking surface and including a primary charge coil and a mechanical conveyor having the primary charge coil mounted thereon and being configured to move the primary charge coil across and between the multiple parking spots, wherein the mechanical conveyor includes a first portion disposed within the first channel and configured to move the primary charge coil across and between the parking spots, and a second portion disposed within at least one of the second channels and configured to move the primary charge coil longitudinally within a corresponding parking spot.

2. The vehicle charging system of claim 1 wherein the second portion is disposed on and carried by the first portion.

3. The vehicle charging system of claim 1 wherein the first portion is disposed on and carried by the second portion.

4. A vehicle charging system comprising:
    a parking surface having parking spot indicia defining multiple parking spots;
    a mechanical conveyor extending across the multiple parking spots, wherein the parking surface further has a first channel disposed beneath the parking surface and configured to receive a first portion of the mechanical conveyor, and a second channel extending longitudinally within each of the multiple parking spots, intersecting the first channel, and configured to receive a second portion of the mechanical conveyor; and
    a wireless charging station disposed beneath the parking surface and at least partially on the mechanical conveyor, including
        a proximity sensor disposed proximate the parking surface and configured to provide a signal indicative of a vehicle having a receiving coil entering one of the multiple parking spots,
        a movable charging head, and
        a control module programmed to, in response to the signal and to the vehicle coming to a stop, operate the movable charging head to position the movable charging head relative to the receiving coil.

5. The vehicle charging system of claim 4 wherein each of the second channels is disposed between corresponding parking spot indicia.

6. The vehicle charging system of claim 4 wherein operating the movable charging head to position the movable charging head relative to the receiving coil includes
    translating the movable charging head along the first portion to laterally position the movable charging head relative to the receiving coil, and
    in response to a misalignment of the movable charging head with the receiving coil along a vehicle longitudinal axis, translating the movable charging head along the second portion.

7. The vehicle charging system of claim 4 further comprising a first plate assembly disposed proximate the first channel and defining an opening through which the movable charging head extends when positioned relative to the receiving coil.

8. The vehicle charging system of claim 6 further comprising a second plate assembly disposed proximate the second channel and defining a second opening through which the movable charging head extends when positioned relative to the receiving coil.

9. The vehicle charging system of claim 4 wherein the control module is further programmed to, in response to a signal indicative of a second vehicle having a receiving coil entering another of the multiple parking spots and to the second vehicle coming to a stop, queue the second vehicle to be charged by the movable charging head.

10. The vehicle charging system of claim 9 wherein the control module is further programmed to, in response to completion of charging of the vehicle, cease charging and operate the movable charging head to translate from one of the multiple parking spots to the another of the multiple parking spots to position the movable charging head relative to the receiving coil of the second vehicle.

11. The vehicle charging system of claim 4 further comprising a wheel plate disposed above the first channel and defining an opening disposed proximate an intersection between the first channel and the second channel extending longitudinally within each of the multiple parking spots through which the movable charging head extends when positioned relative to the receiving coil.

12. The vehicle charging system of claim 4 wherein the movable charging head includes a lift mechanism and wherein the control module is further programmed to operate the lift mechanism to adjust an optimal air gap between the movable charging head and the receiving coil.

13. The vehicle charging system of claim 4 further comprising a visual indicator disposed proximate the parking surface and between the parking spot indicia, and spaced apart from the mechanical conveyor, wherein the visual indicator is configured to provide a visual target for a driver of a vehicle entering one of the multiple parking spots.

14. The vehicle charging system of claim 4 wherein the parking surface defines a recess between the first portion and indicia configured to receive a vehicle wheel to set a vehicle longitudinal position within one of the multiple parking spots.

\* \* \* \* \*